US012621243B2

(12) United States Patent (10) Patent No.: US 12,621,243 B2
Carofiglio et al. (45) Date of Patent: May 5, 2026

(54) CROSS-LAYER APPLICATION NETWORK FLOW ADAPTATION

(71) Applicant: Cisco Technology, Inc., San Jose, CA (US)

(72) Inventors: Giovanna Carofiglio, Paris (FR); Luca Muscariello, Paris (FR); Jordan François Jean Augé, Saint-Cyr-l-Ecole (FR); Mauro Sardara, Issy-les-Moulineaux (FR); Michele Papalini, Issy les Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/682,040

(22) Filed: Feb. 28, 2022

(65) Prior Publication Data

US 2023/0275841 A1 Aug. 31, 2023

(51) Int. Cl.
| | |
|---|---|
| *H04L 47/2416* | (2022.01) |
| *H04L 41/046* | (2022.01) |
| *H04L 43/08* | (2022.01) |
| *H04L 43/0829* | (2022.01) |
| *H04L 43/0852* | (2022.01) |
| *H04L 43/20* | (2022.01) |
| *H04L 47/193* | (2022.01) |

(Continued)

(52) U.S. Cl.
CPC ........ *H04L 47/2416* (2013.01); *H04L 41/046* (2013.01); *H04L 43/08* (2013.01); *H04L 47/193* (2013.01); *H04L 47/2475* (2013.01); *H04L 47/2483* (2013.01); *H04L 47/283*
(2013.01); *H04L 69/162* (2013.01); *H04L 43/0829* (2013.01); *H04L 43/0852* (2013.01); *H04L 43/20* (2022.05)

(58) Field of Classification Search
CPC ... H04L 41/5003; H04L 69/162; H04L 43/08; H04L 41/046; H04L 41/08; H04L 41/0829; H04L 41/0852; H04L 41/20; H04L 47/193; H04L 47/2416; H04L 47/2475; H04L 47/2483; H04L 47/283
See application file for complete search history.

(56) References Cited

U.S. PATENT DOCUMENTS

| | | | |
|---|---|---|---|
| 7,903,562 B2 | 3/2011 | Barnett et al. | |
| 8,750,207 B2 | 6/2014 | Jeong et al. | |

(Continued)

OTHER PUBLICATIONS

Carofiglio et al. "Enabling ICN in the Internet Protocol: Analysis and Evaluation of the Hybrid-ICN Architecture", ICN '19: Proceedings of the 6th ACM Confn'ce on Information-Centric Networking, Sep. 24, 2019, pp. 55-66. (Year: 2019).*

(Continued)

*Primary Examiner* — Thomas J Dailey
(74) *Attorney, Agent, or Firm* — Lee & Hayes, P.C.

(57) ABSTRACT

In one embodiment, an agent executed on a device receives performance metrics regarding a transport layer of the device. The agent sends the performance metrics to an application executed on the device. The application makes, based on the performance metrics, a determination indicating one or more adjustments to a packet flow of a plurality of packet flows sent by the application. The application, based on the determination, sends an adjusted packet flow according to the one or more adjustments as part of the plurality of packet flows.

20 Claims, 6 Drawing Sheets

(51) Int. Cl.

| | |
|---|---|
| *H04L 47/2475* | (2022.01) |
| *H04L 47/2483* | (2022.01) |
| *H04L 47/283* | (2022.01) |
| *H04L 69/16* | (2022.01) |

(56) References Cited

U.S. PATENT DOCUMENTS

| | | | | |
|---|---|---|---|---|
| 9,215,188 | B2 | 12/2015 | Masputra et al. | |
| 10,412,609 | B2 | 9/2019 | Andersson et al. | |
| 10,560,388 | B2 | 2/2020 | Ho et al. | |
| 2005/0114541 | A1* | 5/2005 | Ghetie | H04L 47/20 |
| | | | | 709/224 |
| 2006/0149845 | A1* | 7/2006 | Malin | H04L 67/61 |
| | | | | 709/228 |
| 2010/0182912 | A1* | 7/2010 | Hongisto | H04L 47/803 |
| | | | | 370/242 |
| 2012/0284403 | A1* | 11/2012 | Bansal | H04L 69/326 |
| | | | | 709/224 |
| 2016/0021397 | A1* | 1/2016 | Stepin | H04N 19/577 |
| | | | | 375/240.12 |
| 2017/0070416 | A1* | 3/2017 | Narayanan | H04L 45/38 |
| 2019/0132219 | A1* | 5/2019 | Gandhi | H04L 41/5003 |
| 2020/0044955 | A1* | 2/2020 | Pugaczewski | H04L 41/5025 |
| 2020/0153701 | A1* | 5/2020 | Mohan | H04L 43/10 |
| 2021/0211347 | A1 | 7/2021 | Vasseur et al. | |
| 2022/0174589 | A1* | 6/2022 | Bellamkonda | H04W 52/0206 |

OTHER PUBLICATIONS

Louth, William. "QoS for Applications: A Resource Management Framework for Runtimes", Infoq.com, Jul. 26, 2011 [retrieved on Sep. 5, 2022]. Retrieved from the Internet: <URL: https://www.infoq.com/articles/QoS-for-Applications>. (Year: 2011).*

Abdellatif et al. "Management of industrial communications slice: Towards the Application Driven Networking concept", Computer Communications, Elsevier, 2020, 155, pp. 104-116. DOI: 10.1016/j.comcom.2020.02.057. (Year: 2020).*

Suthon et al. "QMan: an adaptive end-to-end QoS management architecture", 2004 12th IEEE Int'l Confn'ce on Networks, Nov. 19, 2004, pp. 797-803. DOI: 10.1109/ICON.2004.1409291. (Year: 2004).*

Zhong et al. "Performance Analysis of Application-Based QoS Control in Software-Defined Wireless Networks", 2014 IWCMC, Aug. 4, 2014 [retrieved on Feb. 9, 2023]. INSPEC Accession No. 14618969. DOI: 10.1109/IWCMC.2014.6906401. (Year: 2014).*

"HICN", online: https://wiki.fd.io/view/HICN, Mar. 27, 2020, accessed Feb. 10, 2022, 4 pages, FD.io.

"Hybrid Information—Centric Networking", online, accessed Feb. 10, 2022, 4 pages, FD.io.

Muscariello, et al., "Hybrid Information-Centric Networking", Internet Draft: draft-muscariello-intarea-hicn-01, Dec. 4, 2018, 22 pages, IETF Trust.

Muscariello, et al., "Hybrid Information-Centric Networking", Internet Draft: draft-muscariello-intarea-hicn-04, May 20, 2020, 22 pages, IETF Trust.

\* cited by examiner

500

505

START

510

RECEIVE, BY AGENT, PERFORMANCE
METRICS REGARDING DEVICE

515

SEND, BY AGENT, PERFORMANCE METRICS
TO APPLICATION ON THE DEVICE

520

MAKE, BY APPLICATION, DETERMINATION INDICATING
ADJUSTMENT(S) TO APPLICATION PACKET FLOW(S)

525

SEND, BY APPLICATION, ADJUSTED PACKET FLOW(S)

530

END

CROSS-LAYER APPLICATION NETWORK FLOW ADAPTATION

TECHNICAL FIELD

The present disclosure relates generally to computer networks, and, more particularly, to cross-layer application network flow adaptation.

BACKGROUND

Devices are increasingly being used for user-facing applications that provide a plethora of uses like gaming, video-conferencing, multimedia consumption, etc., all of which are executed at the application level of the Open Systems Interconnection (OSI) model. Conventionally, these applications lack visibility into performance of other OSI model layers, for example, the transport layer or the network layer. Applications may be configured to attempt to improve Quality of Experience (QoE) performance, which may be understood as an end user's subjective assessment of how a given application is performing, based on partial or incomplete network information. This results in applications often-times having slow reactions and/or incorrect solutions for network changes at other layers of the OSI model.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
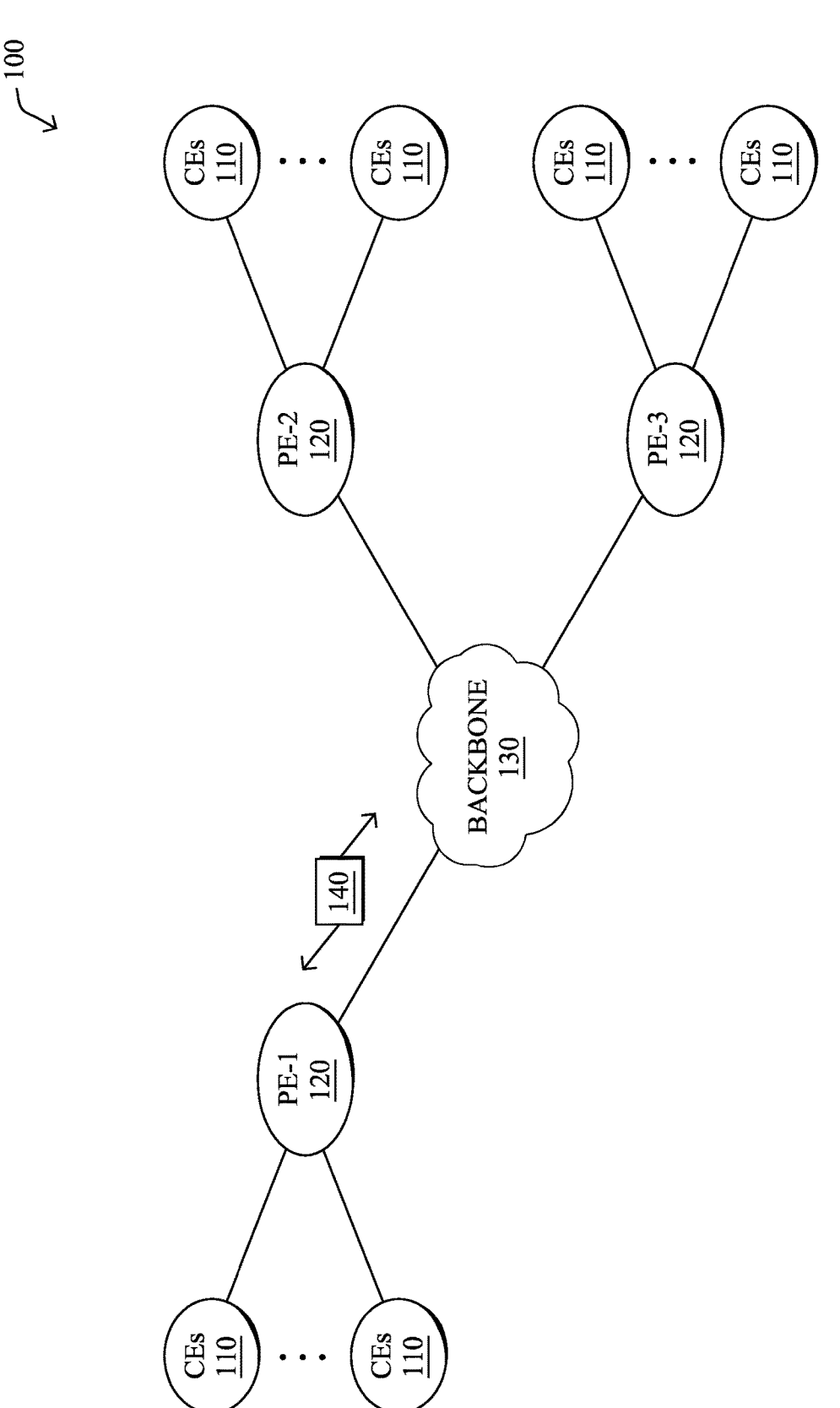
FIGS. 1A-1B illustrate an example communication network.

According to one or more embodiments of the disclosure, an agent executed on a device receives performance metrics regarding a transport layer of the device. The agent sends the performance metrics to an application executed on the device. The application makes, based on the performance metrics, a determination indicating one or more adjustments to a packet flow of a plurality of packet flows sent by the application. The application, based on the determination, sends an adjusted packet flow according to the one or more adjustments as part of the plurality of packet flows.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light-paths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
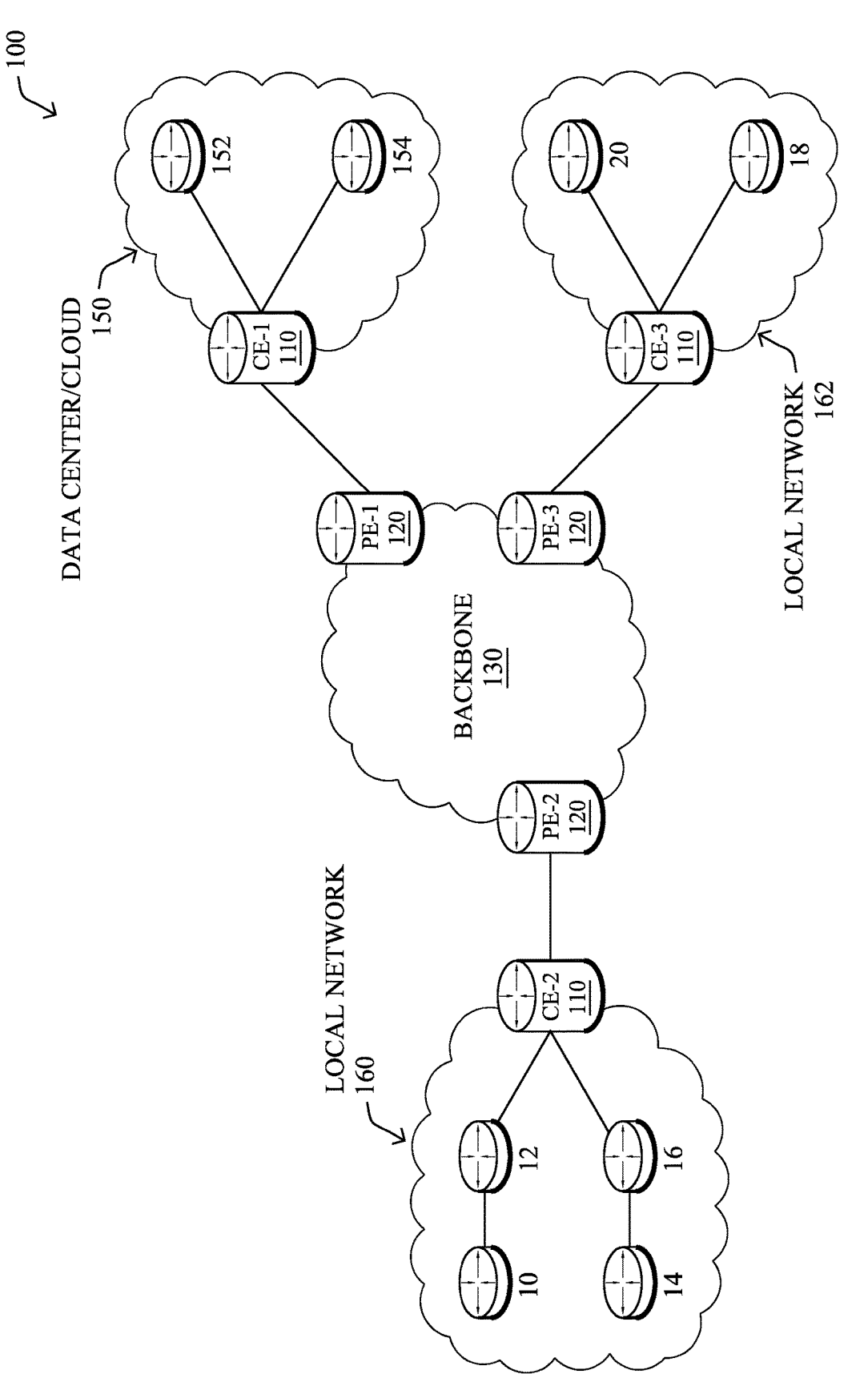

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
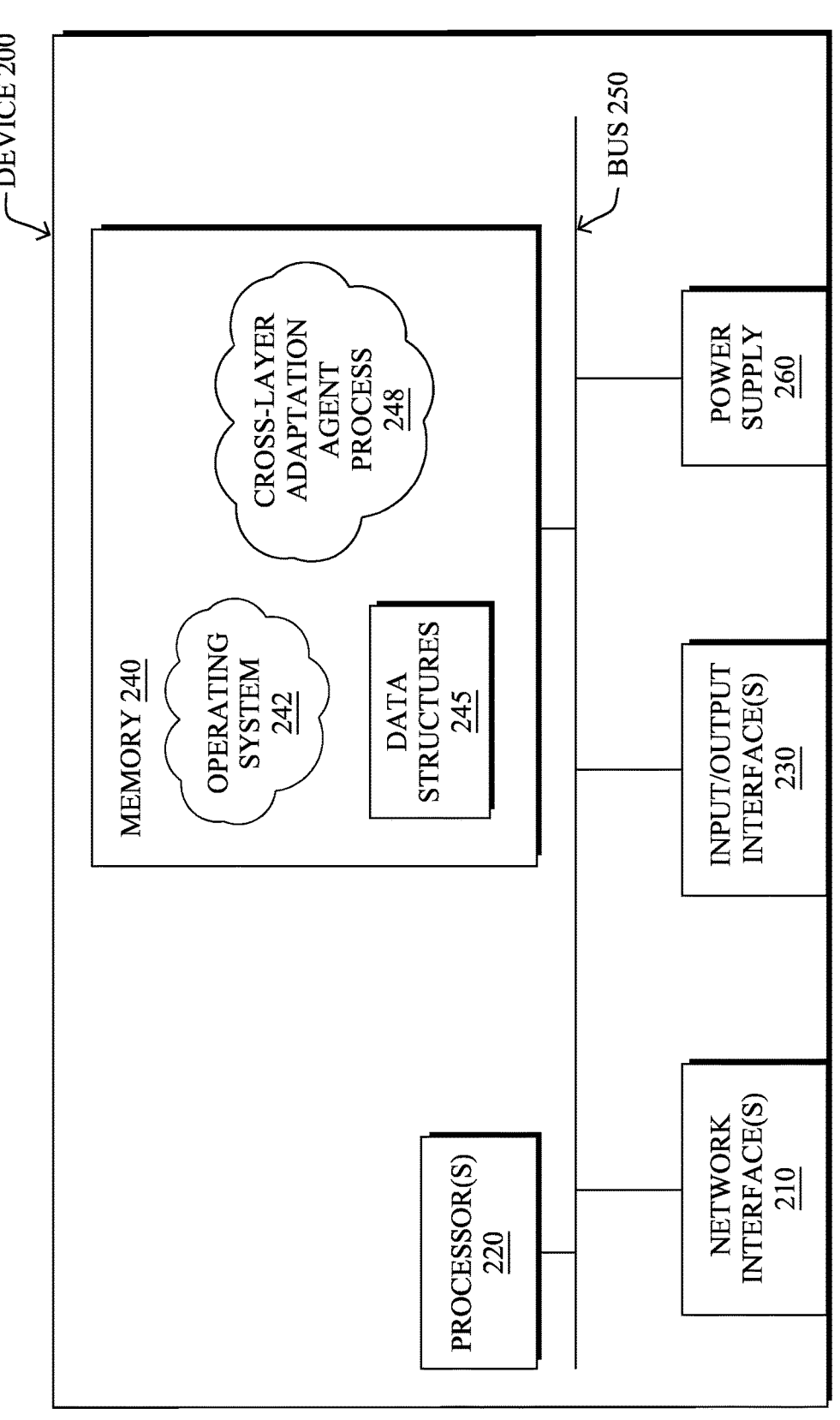
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise cross-layer adaptation agent process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, a given mobile device (e.g., cellphone, tablet, laptop, etc.) may send out a plurality of packet (or network) flows from a plurality of different applications that execute on the device. These flows travel a network path from the device through a plurality of networking devices (e.g., routers, switches, telecommunications hardware, etc.) to a destination, where the destination may perform an action, return information/data, etc. Conventionally, measuring the performance of network paths is done in terms of Quality of Service (QoS), which may be understood as a collection of measurements that indicate how well a given network path is performing at a networking device level. These measurements include packet loss, bit rate, throughput, transmission delay, availability, jitter, etc. However, QoS measurements and optimizations based on them might not directly correlate to an increase in end-user quality expectations for a given application (i.e., Quality of Experience (QoE)). That is, QoE may be understood as referring to the subjective assessment of an application experience from the standpoint of a user of the application. QoE may be measured within the application itself, for example, using intra-application ratings of an application (e.g., a session of videoconference application may be rated from zero to five). In another example, QoE of a given application executing on a device may be measure by another application of the device. QoE may also be measured using a side channel such as satisfaction surveys via email, text message, etc. In the aggregate, QoE-type ratings may be indicated by a mean opinion score.

Traditionally, QoS has been used as a proxy for QoE. For example, QoS measurements may be compared to one or more service level agreements (SLAs), where a given SLA, as is understood in the art, may include a plurality of minimum requirements for a measured network quality metric, guarantees of service, etc. When using QoS as a proxy for QoE, for example, QoS measurements may be compared to an SLA and, if requirements of the SLA are met, then it is assumed that an end user's experience of the application is "good." However, it has become increasingly evident that there are many scenarios where QoS analysis of network paths does not map to QoE assessments of a user's experience. For example, QoS metrics for a web browser application on a device may indicate that that the application is not meeting SLA requirements, but an end user's subjective experience, in terms of QoE, may still be "good." On the other hand, there are cases, where QoS metrics for a videoconference application indicate that the application is meeting SLA requirements, but an end user's QoE of the application may be "bad."

As noted above, mobile devices are increasingly being used for user-facing applications that provide a plethora of uses like gaming, videoconferencing, multimedia consumption, etc., all of which are found at the application level of the Open Systems Interconnection (OSI) model. Conventionally, these applications lack visibility into end-to-end network path performance, which may be monitored in part at the transport layer and/or network layer (e.g., in terms of QoS or other performance metrics/statistics). Therefore, applications attempting to improve QoE are doing so based on control loops using partial or incomplete information. This results in applications oftentimes having slow reactions and/or incorrect solutions for changes at other layers of the OSI model, particularly the transport layer. Even more, a given application may provide a plurality of functions, features, etc. that each may require varying level of prioritization, treatment, etc. In the case of a videoconferencing application, it may communicate both text-based messaging data that may not require a high level of service as well as audio/video data that does. Without access to complete transport layer statistics, control loops between an application at the application layer and the transport layer of a device, in either direction, may not properly or optimally maximize QoE performance of the application.

Various solutions exist that address an application, at the application layer, managing or assessing transport layer properties. For instance, an application according to TAPS may be configured to specify preferences and requirements for its flows, and if an available transport protocol supports them, that protocol is selected. Such approach, however, does not provide an interface to promptly expose transport statistics/events to the application, resulting in slow reactions to network changes from the application perspective. As an example, the application may generally require that its flows, at the transport layer, are to be optimized for low latency and to use a specific network interface. If at a certain point the transport cannot provide the low latency requirements anymore (e.g., because the delay becomes too high), QoE may be negatively impacted. In such case, the application would require time to identify the transport layer deficiencies then address them. In a similar vein, other approaches are based on a posteriori root cause analysis from the perspective on an application, for example, by using probes and data aggregation/scoring. These approaches do not provide real-time analysis of a transport layer (by an application) or an application (by a transport layer), so QoE is still diminished.

Cross-Layer Application Network Flow Adaptation

The techniques herein introduce mechanisms for cross-layer application network flow adaptation that allows communication between an application (at an application layer) and a transport layer of a device. Control loop mechanisms, both from an application to a transport layer and from a transport layer to an application, are enabled to optimally address QoE of the application, which as described above herein, relate to end user subjective experiences of application performance, as opposed to QoS in relation to SLAs. One or more agent processes, which may include an application programming interface (API), are implemented such that a transport layer of a device is configured to communicate granular, low-level statistics regarding performance at the transport layer (e.g., loss rate, delay, jitter, etc.) or recommendations (e.g., congestion events) to an application. Using this information, the application may then be configured to adjust one or more of its packet flows in response to information reported by the transport layer and coordinate adjustments with the transport layer. In the other direction, the application may be configured to communicate optimizations, transport layer parameters, etc. to the transport layer, in order to optimize available resources at the transport layer as well as QoE, all on a per-flow basis such that different flows for a given application may be treated accordingly.

For example, an application may be notified of latency increase(s) observed at a transport layer in real-time (or near real-time) then determine adjustments for one or more its outgoing packet flows. That is, the application is enabled to, for example, direct one or more of its packet flows to a different path prior to the observed latency being "too high." In some cases, the latency may be deemed "too high" if there are observed trends in latency increases, a threshold is reached, etc. In another example, the transport layer may be configured to communicate that a network problem is being observed while it is occurring (e.g., congestion), and the application may then determine one or more adjustments prior to the network problem adversely affecting application QoE.

Specifically, according to one or more embodiments of the disclosure as described in detail below, an agent executed on a device receives performance metrics regarding a transport layer of the device. The agent sends the performance metrics to an application executed on the device. The application makes, based on the performance metrics, a determination indicating one or more adjustments to a packet flow of a plurality of packet flows sent by the application. The application, based on the determination, sends an adjusted packet flow according to the one or more adjustments as part of the plurality of packet flows.

Illustratively, the techniques described herein may be performed by hardware, software, and/or firmware, such as in accordance with cross-layer adaptation agent process 248, which may include computer executable instructions executed by the processor 220 (or independent processor of interfaces 210) to perform functions relating to the techniques described herein.

Figure 3:
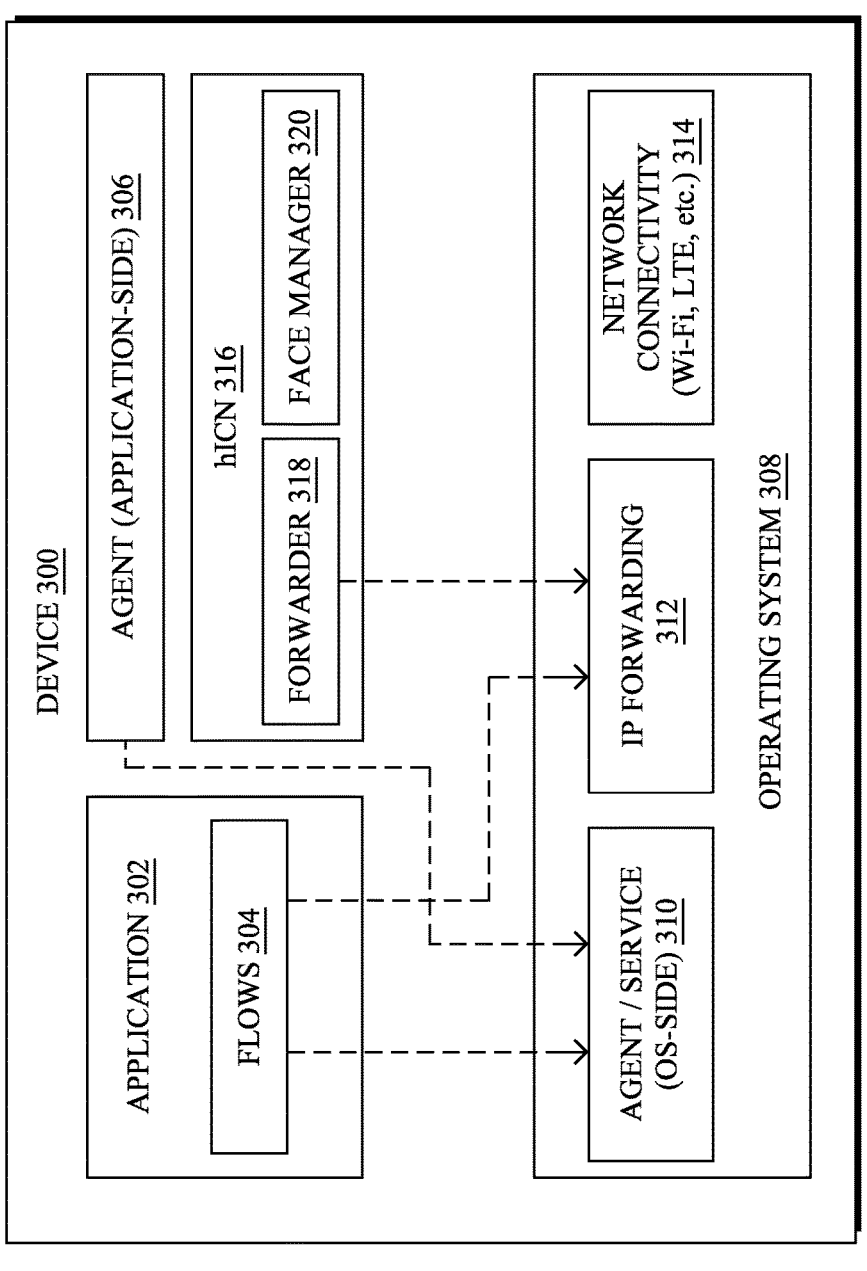
FIG. 3 illustrates an example device for cross-layer application network flow adaptation.

Operationally, FIG. 3 illustrates an example device for cross-layer application network flow adaptation. Device 300 may comprise any end user computing device which a user may use to communicate with other computing devices, for example, a mobile device such as a cellphone, tablet, laptop, cellphone, etc. Device 300, as shown, may comprise application 302 that each generated flow(s) 304 during their execution and an application-side agent 306. Further, operating system 308 may be configured as described above with respect to operating system 242 of FIG. 2, where operating system 308 may manage network communications, input/output, etc. of device 300. Of note, operating system 308 comprises operating system-side agent/service 310, where application-side agent 306 and operating system-side agent/service 310 may comprise components, hardware, software, etc. that are used to implement cross-layer adaptation agent process 248. As is understood in the art, operating system 308 may further comprise IP forwarding component 312 and network connectivity components 314 which are implemented in accordance with enabling various networking communications software, hardware, components, etc. on device 300. For example, network connectivity components 314 may include Wi-Fi, cellular, etc. components.

In addition, device 300 may comprise a Hybrid Information-Centric Networking component 316 (hICN component), that enables device 300 to make use of IPv6 or IPv4 to realize location-independent communication. Notably, forwarder 318 and face manager 320 of Hybrid Information-Centric Networking component 316 may be implemented such that device 300 is enabled with many-to-many communications, multi-homing, multi-path, multi-source, group communications to the Internet Protocol without replicated unicast. This may be implemented using transport protocols in combination with application-side agent 306 and/or operating system-side agent/service 310, such that application 302 may, as described in more detail herein, receive performance transport layer metrics of device 300 (e.g., using a socket API and/or providing name-based sockets to applications). In an embodiment, it is contemplated that application 302 may comprise a native application to the device 300 that communicates with a networking stack (e.g., of operating system 308). In this embodiment, the native application may be configured itself to operate as application-side agent 306.

Application-side agent 306 and/or operating system-side agent/service 310 may comprise application enablement components (for application 302), application policies (e.g., QoE minimums, requirements, etc.), as well as QoE inference components. Altogether, these components may be defined and specified by end users, managers/stakeholders, etc. of application 302, including flow profiles that are unique to a particular application and include one or more flow treatment policies for network flow, traffic, packets, etc. generated (or caused to be generated) by the application that reflect various QoE enhancements desired for a given function of the application. Specifically, a particular profile for an application may define how various network traffic output by the application is to be treated and the particular profile may further define particular performance requirements for various flows/functions of the application. The particular profile may specify QoS-type requirements like bandwidth, loss rate, latency, packet delay, etc. and/or QoE-based requirements, such as video frames per-second, image resolution preferences, etc. In addition, the particular profile may include various weightings that are applied to different QoS and/or QoE requirements, where a weighting indicates relative importance of a given requirement (over other requirements). For instance, a profile for a gaming application may require that data related to a user's gaming experience is prioritized for as soon as possible delivery service, while data related to chat/text messages is de-prioritized. It is contemplated that application-side agent 306 may be configured to translate QoE-type requirements found in a flow profile into QoS-type requirements, based on, for example, heuristics, machine learning-based approaches, end user configured logic, etc.

Application 302 of device 300 may comprise applications that may be executed on device 300 (along with operating system 308), for example, a videoconference application, a multimedia application, a gaming application, etc. that communicate one or more network flows which travel over network communication paths external to the device. It is to be understood that each of these applications may send out various network flows that each require varying degrees of prioritization, treatment, etc., particularly with respect to how flow(s) 304 are to be communicated between application 302 and a transport layer of device 300, located within operating system 308.

Regarding communication of transport layer performance metrics (e.g., statistics and recommendations), such information may be gathered, monitored, measured, etc. by application-side agent 306 and/or operating system-side agent/service 310. Specifically, such information may include round trip time information, loss rate, jitter, queuing delay, explicit congestion signals, etc. of outgoing network/ packet flows measured at a transport layer from device 300. Communication of this information to application 302 is accomplished by application 302 using one or more callbacks, as is understood in the art. Of note, statistics-type information may be retrieved by application 302 periodically (e.g., according to a time interval configured by the application 302). Other event-based information, such as that which indicates congestion occurring on one or more outgoing flows of device 300 may be configured to be signaled to application 302 as soon as they are detected. This type of information may be signaled using a dedicated callback so that the application 302 is informed correspondingly.

In an example related to rate adaptation for flow(s) 304 of application 302, application 302 may be configured to monitor each of its ongoing flows (e.g., flow(s) 304), and to, at the application-level, determine whether any of its flows are to be prioritized (e.g., according to a flow profile as described above). Such prioritization may be correlated to a particular flow requiring a higher rate as compared to other flows of application 302, based on available rates for all flows of application 302. Contrastingly, components at a transport layer of device 300, are incapable of having per-flow visibility that application(s) has (i.e., the transport layer is conventionally only "sees" a single outgoing flow). Application-side agent 306 and/or operating system-side agent/service 310 may optimally prioritize individual flows of a particular application. For example, in the case of rate adaptation, when operating system-side agent/service 310 detects congestion of an outgoing flow, it may be configured to communicate or signal the congestion to application 302. As soon as the congestion is detected, operating system-side agent/service 310 may send a congestion alert to application 302 using a dedicated callback (e.g., via application-side agent 306). Once the congestion signal is received, application 302 is configured to adapt to the congestion by, for example, reducing rate(s) of de-prioritized flows (according to application-specific QoE settings), thereby reducing total used bandwidth of application 302 to address the detected congestion.

Additionally, application 302 may be configured to leverage application-side agent 306 and/or operating system-side agent/service 310 so as to customize transport layer parameters and/or treatment for flow(s) 304, according to its associated QoE requirements at a per-flow basis. That is, application 302 may set parameters at a per-flow basis by using or modifying one or more sockets implemented by application-side agent 306 and/or operating system-side agent/service 310. Such socket options may specify, for example, a maximum allowed end-to-end delay, enable/ disable various transport layer functions, etc. Specifically, application 302 may enable or disable one or more transport layer functions (e.g., loss protection) provided by operating system 308 according to QoE requirements of application 302. Because application 302 is capable of identifying each of its flow(s) 304, it may be configured to determine whether which of the flows requires higher prioritization. For example, a videoconferencing application may enable loss protection for its audio flows, while disabling loss protection for its video flows (due to application 302 being configured to handle video loss at the application layer). Additionally, application 302 may be configured to perform function customization for one or more of its flow(s) 304, as opposed to default parametrization that may be conventionally applied at the transport layer. In the case of application 302 comprising a videoconferencing application, application

302 may comprise more stringent requirements for audio flows than video flows in terms of latency. As such, application 302 may set different delay constraints for each flow, and components of operating system 308 may configured transport layer parameters and/or settings accordingly. Specifically, operating system-side agent/service 310 may be configured to apply forward error correction (FEC) to recover losses for audio flows and to apply retransmission mechanisms for video flows.

Figure 4:
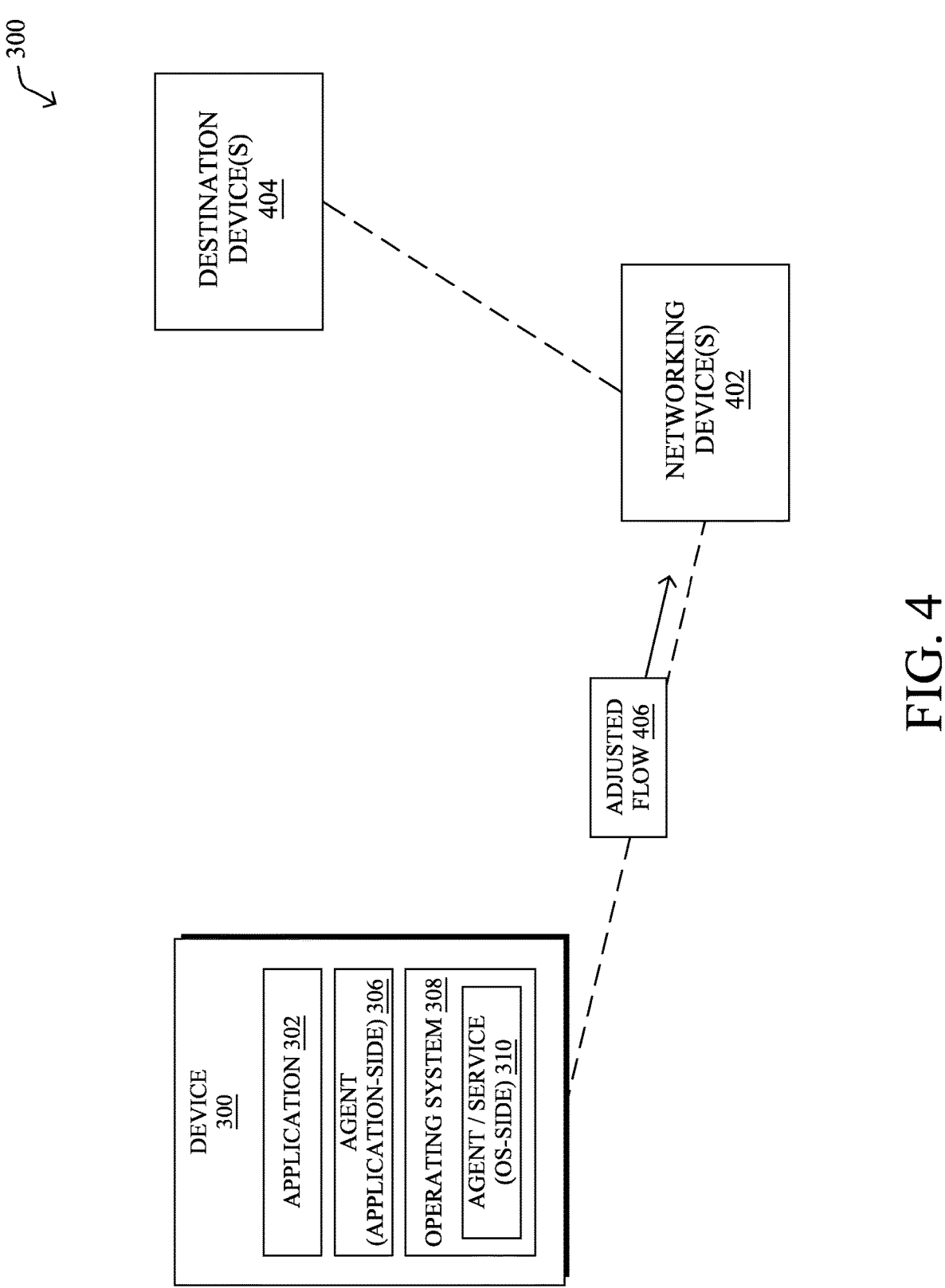
FIG. 4 illustrates an example architecture for cross-layer application network flow adaptation.

Operationally, FIG. 4 illustrates an example architecture for cross-layer application network flow adaptation, where architecture 400 may include device 300, networking device(s) 402 and destination device(s) 404. Generally, destination device(s) 404 may comprise computing resources, data storage, etc. that application 302 may access or use during execution. Outgoing network flows from device 300 may travel over paths comprising networking device(s) 402 to destination device(s) 404. It is to be understood that each of these applications may send out various network flows that each require varying degrees of prioritization, treatment, etc. As described herein above, an adjusted flow 406 from device 300 may be sent, after the adjusted flow 406 has adapted by application-side agent 306 and/or operating system-side agent/service 310. Notably, different flows for application 302 may be treated based on transport layer statistics (that application 302 has gained visibility into according to the techniques described herein).

Figure 5:
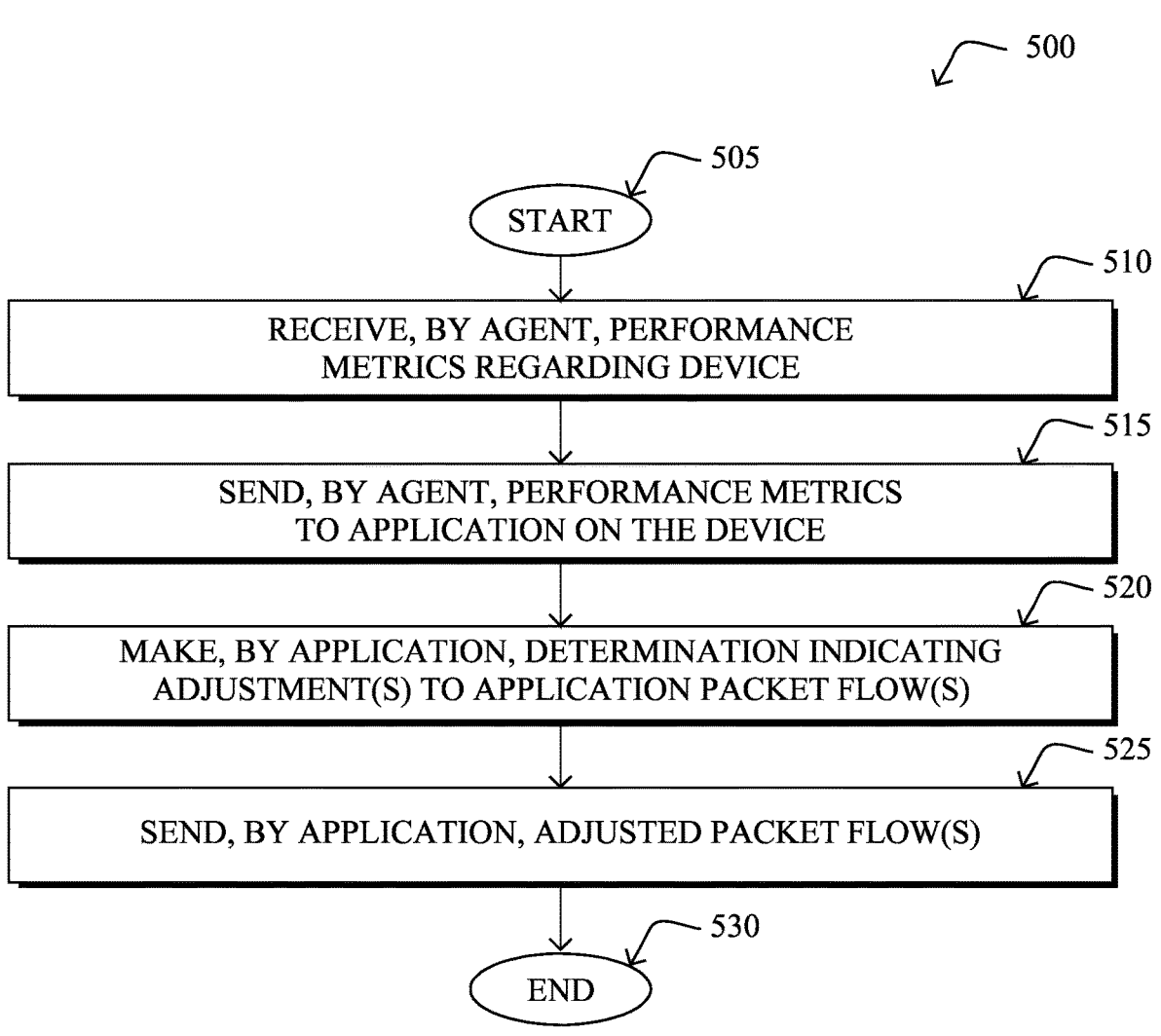
FIG. 5 illustrates an example simplified procedure for cross-layer application network flow adaptation.

FIG. 5 illustrates an example simplified procedure (e.g., a method) for cross-layer application network flow adaptation, in accordance with one or more embodiments described herein. For example, a non-generic, specifically configured device (e.g., device 200), may perform procedure 500 by executing stored instructions (e.g., cross-layer adaptation agent process 248). The procedure 500 may start at step 505, and continues to step 510, where, as described in greater detail above, an agent executed by a device may receive performance metrics regarding a transport layer of the device. In an embodiment, the performance metrics regarding the transport layer may comprise round trip time information, loss rate, jitter, queuing delay, or explicit congestion signals. In a further embodiment, the performance metrics may be sent to the application at a periodic interval configured at the application. In another embodiment, the performance metrics may be sent to the application at in response to the agent detecting a network change event.

At step 515, as detailed above, the agent may send the performance metrics to an application executed on the device. In an embodiment, the agent may send the performance metrics to the application using Hybrid Information-Centric Networking.

At step 520, the agent may make, based on the performance metrics, a determination indicating one or more adjustments to a packet flow of a plurality of packet flows sent by the application. In one or more embodiments, the one or more adjustments may comprise transport layer parametrization different than default parametrization applied to the packet flow at the transport layer. In an embodiment, the one or more adjustments may be based on Quality of Experience profile associated with the application. In a further embodiment, the plurality of packet flows may comprise a video flow and an audio flow (e.g., of a gaming application, videoconferencing application, multimedia application, etc.).

At step 525, as detailed above, the agent may send, based on the determination, an adjusted packet flow according to the one or more adjustments as part of the plurality of packet flows. In an embodiment, the one or more adjustments may comprise enabling or disabling a transport function differently than one applied to the plurality of packet flows. In one or more embodiments, the one or more adjustments may comprise modifying, by the application, socket options associated with the packet flow. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for cross-layer application network flow adaptation that allows communication between an application (at an application layer) and a transport layer of a device. That is, control loop mechanisms (application layer to transport layer as well as transport layer to application layer) optimally address application QoE. One or more agent processes, which may include an application programming interface (API), are implemented such that a transport layer of a device is configured to communicate granular, low-level statistics regarding network performance or recommendations. Using this information, the application may then be configured to adjust one or more of its packet flows in response to information reported by the transport layer and coordinate adjustments with the transport layer. In the other direction, the application may be configured to communicate optimizations, transport layer parameters, etc. to the transport layer, in order to optimize available resources at the transport layer as well as QoE, all on a per-flow basis such that different flows for a given application may be treated accordingly.

While there have been shown and described illustrative embodiments that provide cross-layer application network flow adaptation, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by an application agent executed on an end user computing device, performance metrics of outgoing packet flows observed at a transport layer of the end user computing device from an operating-system service agent on the end user computing device;
in response to the performance metrics for a particular packet flow of a plurality of packet flows of an application satisfying a per-flow condition, making, by the application agent, a determination to adjust a transport function for the particular packet flow while maintaining a different transport function for at least one other packet flow of the application;
causing, by the application agent, configuration of the transport function for the particular packet flow by the operating-system service agent according to the determination; and
causing, by the application agent, transmission of the particular packet flow as an adjusted packet flow by the operating-system service agent according to the determination as part of the plurality of packets flows.

2. The method as in claim 1, wherein the transport function comprises a loss protection function.

3. The method as in claim 1, wherein the determination further adjusts by modifying socket options associated with the particular packet flow.

4. The method as in claim 1, wherein the determination is further to adjust transport layer parametrization different than default parametrization applied to the particular packet flow at the transport layer.

5. The method as in claim 1, wherein the operating-system service agent sends the performance metrics to the application agent using Hybrid Information-Centric Networking.

6. The method as in claim 1, wherein the performance metrics regarding the transport layer comprise round trip time information, loss rate, jitter, queuing delay, or explicit congestion signals.

7. The method as in claim 1, wherein the performance metrics are sent to the application agent at a periodic interval configured at the application.

8. The method as in claim 1, wherein the performance metrics are sent to the application agent in response to the operating-system service agent detecting a network change event.

9. The method as in claim 1, wherein the determination is based on Quality of Experience profile associated with the application.

10. The method as in claim 1, wherein the plurality of packet flows comprises a video flow and an audio flow.

11. An end user computing device, comprising:
one or more interfaces;
a processor coupled to the one or more interfaces and configured to execute one or more processes; and
a memory configured to store a process that is executable by the processor, the process when executed configured to:
receive, by an application agent executed on the end user computing device, performance metrics of outgoing packet flows observed at a transport layer of the end user computing device from an operating-system service agent on the end user computing device;
in response to the performance metrics for a particular packet flow of a plurality of packet flows of an application satisfying a per-flow condition, making, by the application agent, a determination to adjust a transport function for the particular packet flow while maintaining a different transport function for at least one other packet flow of the application;

cause, by the application agent, configuration of the transport function for the particular packet flow by the operating-system service agent according to the determination; and cause, by the application agent, transmission of the particular packet flow as an adjusted packet flow by the operating-system service agent according to the determination as part of the plurality of packets flows.

12. The end user computing device as in claim 11, wherein the transport function comprises a loss protection function.

13. The end user computing device as in claim 11, wherein determination further adjusts by modifying socket options associated with the particular packet flow.

14. The end user computing device as in claim 11, wherein the determination is further to adjust transport layer parametrization different than default parametrization applied to the particular packet flow at the transport layer.

15. The end user computing device as in claim 11, wherein the operating-system service agent sends the performance metrics to the application agent using Hybrid Information-Centric Networking.

16. The end user computing device as in claim 11, wherein the performance metrics regarding the transport layer comprise round trip time information, loss rate, jitter, queuing delay, or explicit congestion signals.

17. The end user computing device as in claim 11, wherein the performance metrics are sent to the application agent at a periodic interval configured at the application.

18. The end user computing device as in claim 11, wherein the performance metrics are sent to the application agent at in response to the operating-system service agent detecting a network change event.

19. The end user computing device as in claim 11, wherein the determination is based on Quality of Experience profile associated with the application.

20. A tangible, non-transitory, computer-readable medium storing program instructions that cause an end user computing device to execute a process comprising:

receiving, by an application agent executed on the end user computing device, performance metrics of outgoing packet flows observed at a transport layer of the end user computing device from an operating-system service agent on the end user computing device;

in response to the performance metrics for a particular packet flow of a plurality of packet flows of an application satisfying a per-flow condition, making, by the application agent, a determination to adjust a transport function for the particular packet flow while maintaining a different transport function for at least one other packet flow of the application;

causing, by the application agent, configuration of the transport function for the particular packet flow by the operating-system service agent according to the determination; and causing, by the application agent, transmission of the particular packet flow as an adjusted packet flow by the operating-system service agent according to the determination as part of the plurality of packets flows.

* * * * *